United States Patent Office 3,686,268
Patented Aug. 22, 1972

3,686,268
PROCESS OF MANUFACTURE OF ACRYLIC AND METHACRYLIC HIGHER ESTERS
Raymond Jobert, and Bernard Vuchner, Saint-Avold, France, assignors to Ugine Kuhlmann, Paris, France
No Drawing. Filed Feb. 24, 1970, Ser. No. 13,845
Int. Cl. B01j 9/04; C07c 69/54
U.S. Cl. 260—465.4          12 Claims

ABSTRACT OF THE DISCLOSURE

Process for the manufacture of acrylic and methacrylic higher esters of maximum purity with high yields without the formation of undesirable by-products diminishing the yields or polluting the intermediate reaction products by transesterification of an alcohol with an acrylate or methacrylate of the formula

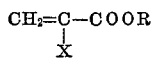

in which X is a hydrogen atom or a methyl group and R is an alkyl group containing less carbon atoms than the alcohol, in the presence of a titanium phenoxide catalyst and drawing off the alcohol formed by azeotropic distillation with the light or lower ester.

DESCRIPTION OF THE PRIOR ART

The production of esters of higher alcohols, also called higher esters or heavy esters, by transesterification with an ester of a lower alcohol, also called a light or lower ester, using an excess of light ester and also utilizing that ester as a carrying agent for the lower alcohol produced in the course of the reaction is well known. It is also known to accelerate this reaction through the use of a catalyst and to recycle the fraction of light ester-light alcohol for subsequent manufacture of the light ester.

Of all the catalysts so far known, those giving the best results are the tetra-alkyl titanates and, in particular, the tetrapropyl, tetraisopropyl and tetrabutyl titanates. The use of these catalysts result in short reaction times and good quality products of excellent yield, without the formation of heavy products (particularly in the acrylic serie) and without causing dehydration of the alcohol used. However, they present the disadvantage of liberating the alcohol they contain such as propanol, isopropanol and butanol. The alcohol liberated then pollutes the mixtures, either in the form of the alcohol or in the form of the corresponding ester, which distills mainly at substantially the same time as the first fraction, and the lower alcohol produced by the reaction is eliminated with the light ester in the same fraction. These impurities degrade the quality of the light ester and recycling of the latter thus becomes difficult, if not impossible. Furthermore, traces of these foreign esters may remain in the higher ester, and the purity is thus diminished.

It is possible to solve at least one of these problems by using the titanate of the alcohol corresponding to the higher ester sought or of the original light ester. But light alcohol titanates, such as tetramethyl or tetraethyl titanates, are too sensitive to hydrolysis to be used; and if the titanates of the higher alcohols involved in the reacion were to be used, one would need as many kinds of catalysts as products to be manufactured, which would be a burden.

Alkyl titanates also have the disadvantage of being more or less sensitive to hydrolysis. They therefore require the use of an anhydrous reagent or must be distilled before introduction of the catalyst in order to dry the reactants, resulting in a loss of time and productivity of the equipment. Furthermore, the hydrolysis causes destruction of the catalyst resulting in an increased consumption and cost of the ester.

Total hydrolysis of the catalyst, through voluntary introduction of water at the end of the reaction, is also sometimes compulsory in the case of heavy esters, of alcohols up to 12 to 20 carbon atoms for example, since these esters have boiling temperatures higher than those of the alcohol titanates containing 3 to 4 carbon atoms, otherwise distillation of the catalyst with the ester would produce coloration and polymerization of the ester.

In fact, the alkyl titanates themselves are also polymerization catalysts and one very often observes undesirable polymerization during the reaction, in the course of hydrolysis, or during distillation of the higher ester. These polymerization reactions also cause a reduction in yield.

SUMMARY OF THE INVENTION

This invention relates to the use of titanium phenoxides of the formula

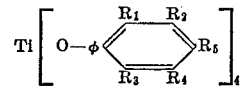

in which $R_1$ and $R_2$ represent a hydrogen atom, an alkyl group containing 1 to 4 carbon atoms, an alkoxyl group containing 1 to 4 carbon atoms, an aryl group, an alkenyl containing 1 to 4 carbon atoms, an amino group, an alkylamine group containing 1 to 4 carbon atoms or a phenylamine group. $R_3$, $R_4$ and $R_5$ have the same meaning as assigned above, but in addition, can also contain a hydroxyl group. These catalysts have been found to be excellent transesterification catalysts for the reaction according to this invention.

These titanium phenoxide catalysts have all of the advantages of alkyl titanates and are additionally advantageous in that the phenoxide catalysts also act as stabilizers for the vinyl or acrylic compounds; are less sensitive to hydrolysis, which makes their reuse possible; do not liberate alcohol that might pollute the light ester and the end product; have very low volatility; diminish the relative volatility of the stabilizer and permit the reaction to be carried out in a continuous manner.

The titanium phenoxides used as catalysts according to this invention can be produced in various manners such as by the reaction of a suitable phenol with titanium tetrachloride in the presence of ammonia, or by transesterification of alkyl titanates with the selected phenol in a suitable solvent.

The titanium phenoxide catalysts are liquid or solid products, heavily colored yellow, red or brown, and can be used directly in the transesterification reaction described herein after filtration of the ammonium chloride formed and evaporation of the solvent.

DETAILED DESCRIPTION OF THE INVENTION

The process according to the invention relates to the production of acrylates or methacrylates of higher alcohols and involves the heating of an alcohol containing at least three linear or branched primary or secondary carbon atoms, herein defined as the higher or heavy alcohol with excess acrylate or methacrylate herein defined as the light ester or lower ester of the formula:

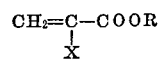

in which X is a hydrogen atom or a methyl group and R is an alkyl group containing less carbon atoms than heavy alcohol, in the presence of a titanium phenoxide catalyst and drawing off the alcohol formed by azeotropic distillation with the light or lower ester.

Alcohols that can be used, according to this invention, include alkanols of 3 to 20 or more carbon atoms, alkoxyalkanols, alkenoxyalkanols, alkenols, phenoxyalkanols, cycloalkanols, alkylcycloalkanols, phenylalkanols, alkylphenylalkanols, haloalkanols, cyanoalkanols, etc., such as butanol, secondary butanol, isobutanol, ethyl-2-hexanol, oxoalcohols, fatty alcohols in the pure state or fatty alcohol cuts, such as those which are available on the market and are mixtures of alcohols containing 12 to 20 carbon atoms, methoxyethanol, ethoxyethanol, benzyl alcohol, phenylethanol, cyclohexanol, phenoxybutanol, hexenol, vinylethanol, 3-heptadecafluoroctylpropanol, glycolonitrile, and so forth.

The phenol compounds used to form the catalyst compounds include, for example monophenols such as cresol, xylenol, ethylphenol, mesitol, thymol, carvacrol, eugenol, isoeugenol, hydroquinone monomethyl ether, dimethyl-2,4-tertiobutyl-6-phenol, ditertiobutyl-2,6-paracresol, tertiobutyl-2-methoxy-4-phenol and paraphenylphenol, diphenols, such as, hydroquinone, resorcinol, pyrocatechol, orcinol, paratertiobutylcatechol and ditertiobutyl-2,5-hydroquinone, triphenols such as pyrogallol, phloroglucinol and hydroxyhydroquinone, aminophenols, hydroxydiphenylamines and so forth.

The light ester used according to this invention can be any acrylic or methacrylic ester in which the alkyl group (R) contains less carbon atoms than the heavy alcohol. It is advantageous, however, to use the methyl or ethyl ester, but R can be a lower alkyl radical containing three or more carbon atoms.

The catalyst can be introduced at the same time as the ester and alcohol reactant or in small portions during the reaction. The quantity used can vary considerably, but is generally from about 0.0001 mol to 0.1 mol and advantageously from about 0.001 to 0.01 mol per mol of heavy alcohol.

The quantity of ester advantageously ranges between about 1.1 and 3 or more mols per hydroxyl group present in the alcohol.

The reaction can be carried out between about 60° C. and 150° C. and advantageously between about 80° C. and 120° C., and preferably at the azeotropic distillation temperature of the initial ester reactant and liberated alcohol. Low pressures can be used to avoid overly high temperatures in the reaction mixture if desired.

The phenol contained in the catalyst stabilizes the reaction mixture and it is therefore absolutely unnecessary to use a standard stabilizer such as, for example, paraphenylenediamine.

The catalysts used according to the invention which are also stabilizers for the reaction mixture as noted above, also reduce the volatility of the phenol. This is very important, particularly in the case of heavy esters as defined above (alcohols containing 12 to 20 carbon atoms) in which the stabilizers distills with the ester unless it is combined in a voluminous molecule. This leads to an ester that is too stabilized to be polymerizable and/or to polymerization of the bottom fraction as a result of disappearance or removal of the stabilizer from the distilling colunmn.

The catalysts used according to the invention, which are very heavy products, do not distill and can therefore continue their catalytic function inside the reactor for following or additional reactions.

The catalysts used according to the invention are also less sensitive to hydrolysis, permitting them to be reused without the necessity of being forced to dry the reactants and permits the reaction to be carried out continuously in one or more stages.

The titanium phenoxides used according to this invention can be prepared by various methods known to those skilled in the art. The following Example I illustrates one method by which the tetramethoxyphenyl titanate can be prepared. The titanium phenoxide catalyst coming within the scope of this invention can be prepared in a similar manner.

EXAMPLE I 150 gms. of hexane and 62 gms. (½ mol) of hydroquinone monomethyl ester were introduced into a 500 cc. flask topped by a packed distilling column equipped with a condenser and a fraction collector. The mixture was brought to reflux and then 35.5 gms. (⅛ mol) of tetraisopropyl titanate were slowly introduced. The isopropanol liberated was distilled in the form of azeotrope with the hexane and then the excess hexane distilled therefrom during which the pressure was gradually lowered to 1 mm. of mercury.

The tetramethoxyphenyl titanate obtained was a reddish brown solid.

EXAMPLE II

In the same equipment as above, 200 gms. (2 mols) of methyl methacrylate, 74 gms. (1 mol) of butanol and 1.08 gms. (0.002 mol) of tetramethoxyphenyl titanate were introduced into the flask and the mixture was brought to reflux under 700 mm. of mercury. 43 gms. of methylmethanol methacrylate azeotrope were successively drawn off or removed over a period of three hours, 85 gms. of methyl methacrylate (under 200 mm. of mercury), 16 gms. of an intermediate fraction and finally, under 40 mm. of mercury, 128 gms. of butyl methacrylate titrating 99.71 percent were removed from the reaction mixture. The yield in relation to alcohol was 95 percent.

By reintroducing a new quantity of the above same reactant on the catalyst residue remaining in the flask, the reaction was immediately activated and was continued and repeated as set forth above without having to add or in any way alter the catalyst again.

EXAMPLE III

By way of comparison, the same conditions as in Example II were repeated, but adding a stabilizer (paraphenylenediamine) and replacing the tetramethoxyphenyl titanate with the same molar quantity of tetraisopropyl titanate. The reaction was not activated when adding the same reactants to the flask containing the residue, and it was necessary to add again up to 0.01 mol of tetraisopropyl titanate for the reaction to take place at an acceptable rate.

On the other hand, if the reactants are dried before the introduction of tetraisopropyl titanate through distillation of the methyl methacrylate, which forms an azeotrope with water, a quantity of 0.002 mol of tetraisopropyl titanate must be added to catalyze the reaction.

But if reactants are reintroduced in the flask on the residue obtained after distillation, it is necessary again to add, in order to maintain an acceptable reaction rate, approximately half the initial catalyst used per operation or reaction, i.e., 0.05 mol.

The first fractions contained isopropanol and isopropyl methacrylate and if these fractions are recycled for further manufacture of methyl methacrylate, these impurities pass into the ester and degrade its quality. Furthermore, chromatography revealed traces of isopropyl methacrylate in the butyl methacrylate obtained. These problems do not arise when the titanium phenoxide is used according to this invention and the catalysts can be reused many times without the addition of fresh catalysts, while tetraisopropyl titanate, which is more sensitive to hydrolysis, demands an addition of fresh catalysts for each operation.

EXAMPLE IV

Example II was repeated using 0.002 mol of each of the different titanium phenoxides as listed in the following Table 1 per mol of butanol for the reaction times, as also set forth in Table 1.

The following Table 1 also shows that the most advantageous catalysts according to the invention are the monophenol titanates.

When the catalysts are set forth in Table 1 were used as in Example II, the same advantageous results were obtained.

TABLE 1

| Titanates | Corresponding phenols | Reaction time, hr. |
|---|---|---|
| Methoxyphenyl | Hydroquinone monomethyl ether. | 3 |
| Hydroxyphenyl p | Hydroquinone | 5 |
| Dihydroxyphenyl | Pyrogallol | 7 |
| Hydroxyphenyl m | Resorcinol | 5 |
| Dimethyl-2,4-tertiobutyl-6-phenyl. | Dimethyl-2,4-tertiobutyl-6-phenyl. | 3 |
| Diphenylamine | Hydroxydiphenylamine | 4 |

EXAMPLE V

In the same equipment as used in Example I, 200 gms. of ethyl acrylate, 74 gms. of butanol and 1 gm. of tetrahydrophenyl titanate were introduced therein and the mixture was brought to reflux at atmospheric pressure. The reaction started immediately and the ethylacrylate-ethanol azeotrope was distilled in two hours.

The excess ethyl acrylate was then distilled at 200 mm. Hg, followed at 40 mm. Hg by an intermediate fraction containing ethyl acrylate, unconverted butanol and butyl acrylate and, finally, 112 gms. of pure butyl acrylate titrating 99.52 percent were recovered.

The yield was 97 percent in relation to the butanol consumed.

EXAMPLE VI

Example V is repeated but replacing the butanol with ethyl-2-hexanol and the tetrahydroxyphenyl titanate with dimethyl-2,4-tertiobutyl-6-phenyl titanate.

The ethyl-2-hexyl acrylate formed was distilled therefrom under 1 mm. Hg.

A pure product titrating 99.59 percent was obtained with a yield of 98.1 percent based on the alcohol consumed.

EXAMPLE VII 200 gms. of methyl methacrylate, 194 gms. of technical grade lauryl alcohol containing approximately 70 percent lauryl alcohol and 30 percent myristyl alcohol and 1 gm. of tetramethoxyphenyl titanate were introduced into the same equipment as described in Example II. The reaction was continued under the same conditions as in Example II for two hours and thirty minutes. The reaction mixture was distilled and 249 gms. of heavy ester were obtained.

The hydroquinone methyl ether content in the heavy ester obtained was about 0.1 percent, as revealed by spectrophotocolorimetric analysis.

By replacing the tetramethyoxyphenyl titanate of Example VII with isopropyl titanate and adding a quantity of hydroquinone methyl ether equivalent to that which was contained in the tetramethoxyphenyl titanate, i.e., 0.9 gms. to stabilize the reaction mixture, the hydroquinone methyl ether content in the heavy ester was 0.3 percent, thus making it quite evident that the use of tetramethoxyphenyl titanate results in the production of a purer heavy ester.

EXAMPLE VIII

Two reactors of 1-liter capacity were set up in series and each equipped with an agitator, an inlet tube, an outlet tube, a thermometer and a suitable means of heating. Each of the reactors was, furthermore, topped by a distilling column equipped with an automatic condenser vapor reflux device. The first reactor was contiuously fed by means of a proportioning pump with a mixture of ethyl acrylate and butanol in a molar ratio of 2 to 1. This mixture also contained 0.002 mol of methoxyphenyl titanate per mol of butanol as catalyst, but no stabilizer. The liquid phase of the first reactor flowed continuously to the second reactor. An adjustable hydraulic valve was used to regulate the rate of feed of the second reactor to the proper value.

The liquid phase of the second reactor was continuously sampled in the same way by means of an adjustable hydraulic valve. The reaction mixture was cooled for purposes of analysis and measurement of the flow in a graduated cylinder.

The reaction mixture was then distilled in a series of continuously operating distilling columns, the first column separating the lights from the crude product and the second column separating the pure product from the catalyst.

The reaction mixture was kept in the reactors at a temperature between 102° C. to 106° C. and the ethyl acrylate-ethanol azeotrope was distilled at 78.5° C. under atmospheric pressure.

After a total residence time of six hours in the two reactors, a crude product titrating 61.15 percent butyl acrylate, 2.71 percent butanol, 34.7 percent ethyl acrylate and 1.27 percent ethanol was collected at the outlet of the second reactor. The reaction was continued in this manner for twenty hours.

The rate of conversion of butanol (butanol transformed into butyl acrylate in relation to the butanol involved) was 92.2 percent.

The yield in relation to the butanol converted (butanol transformed into butyl acrylate in relation to the butanol consumed) was 99 percent.

The raw product coming from the second reactor was distilled and the ethyl acrylate, butanol and residue containing the catalyst were collected and analyzed. The initial mixture was supplemented with the same suitable quantities of butanol and ethyl acrylate and was thus reconstituted before feeding the first reactor. No new quantities of catalyst were added. Continuous operation for twenty hours was resumed with this mixture and it was found that for a total stay of six hours a product was obtained at the outlet of the second reactor having the same composition as described above.

EXAMPLE IX

Example VIII was repeated but a standard catalyst not forming part of the invention was substituted for the catalyst of Example VIII.

Tetraisopropyl titanate was used instead at the rate of 0.002 mol per mol of butanol and paraphenylenediamine was added as a stabilizer to the mixture feeding the first reactor at the rate of 0.2 percent by weight of the total weight of the mixture.

It was found that for a total residence time of six hours the crude mixture coming from the second reactor titrates only 36.05 percent butyl acrylate, and it further contained 11.12 percent butanol, 51.73 percent ethyl acrylate and 1.05 percent ethanol.

The rate of conversion of the butanol was only 68.3 percent owing to the partial hydrolysis of the catalyst. If one recycles, after distillation of the raw product, the catalyst contained in the residue, it will be found in the course of a new continuous operation that there is insufficient catalyst to maintain the same rate of conversion of butanol as before, i.e., 68.3 percent, with a residence time of six hours. Additional quantities of new catalyst must be added to even maintain this low conversion rate.

We claim:

1. A process for the preparation of acrylic and methacrylic higher esters which comprises reacting by transesterification, a lower ester or acrylate having the general formula

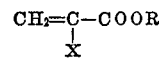

in which X is hydrogen or a methyl group and R is a lower alkyl group with an alcohol containing more carbon atoms than contained in the radical R in the presence of a catalytic amount of a titanium phenoxide catalyst of the general formula:

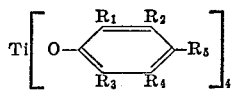

in which $R_1$ and $R_2$ are a hydrogen atom, an alkyl group containing 1 to 4 carbon atoms, an alkoxyl group containing 1 to 4 carbon atoms, an aryl group, an alkenyl group containing 1 to 4 carbon atoms, an amino group, an alkylamino group containing 1 to 4 carbon atoms or a phenylamino group; and $R_3$, $R_4$, and $R_5$ are the same as $R_1$ and $R_2$ or a hydroxyl group.

2. The process of claim 1 in which the reaction is carried out at a temperature between about 60° C. and 150° C.

3. The process of claim 2 in which the titanium phenoxide is present in the reaction mixture between about 0.0001 to 0.1 mol per mol of the alcohol.

4. The process of claim 1 in which the alcohol contains at least three linear or branched primary or secondary carbon atoms with an excess of the acrylate and in which R contains less carbon atoms than the alcohol and removing the alcohol formed together with the lower ester by azeotropic distillation.

5. The process according to claim 1 in which the higher alcohol being reacted is an alkanol containing 3 to at least 20 carbon atoms, an alkoxyalkanol, an alkenoxyalkanol, an alkenol, a phenoxyalkanol, a cycloalkanol, an alkylcyclohexanol, a phenylalkanol, an alkylphenylalkanol, a haloalkanol or a cyanoalkanol.

6. The process according to claim 4 in which the higher alcohol being reacted is an alkanol containing 3 to at least 20 carbon atoms, an alkoxyalkanol, an alkenoxyalkanol, an alkenol, a phenoxyalkanol, a cycloalkanol, an alkylcyclohexanol, a phenylalkanol, an alkylphenylalkanol, a haloalkanol or a cyanoalkanol.

7. The process according to claim 1 in which the phenol compound of the titanium phenoxide is: a monophenol selected from the group consisting of cresol, xylenol, ethylphenol, mesitol, thymol, carbacrol, eugenol, isoeugenol, hydroquinone monomethyl ether, dimethyl-2,4-tertiobutyl-6-phenol, ditertiobutyl-2,6-paracresol, tertiobutyl - 2 - methoxy-4-phenol or paraphenylphenol; a diphenol selected from the group consisting of hydroquinone, resorcinol, pyrocatechol, orcinol, paratertiobutylcatechol or ditertiobutyl-2,5-hydroquinone; or a triphenol selected from the group consisting of pyrogallol, phloroglucinol or hydroxyhydroquinone; an aminophenol or a hydroxydiphenylamine.

8. The process according to claim 4 in which the phenol compound of the titanium phenoxide is: a monophenol selected from the group consisting of cresol, xylenol, ethylphenol, mesitol, thymol, carvacrol, eugenol, isoeugenol, hydroquinone monomethyl ether, dimethyl-2,4-tertiobutyl-6-phenol, ditertiobutyl-2,6-paracresol, tertiobutyl - 2 - methoxy-4-phenol or paraphenylphenol; a diphenol selected from the group consisting of hydroquinone, resorcinol, pyrocatechol, orcinol, paratertiobutylcatechol or ditertiobutyl-2,5-hydroquinone or a triphenol selected from the group consisting of pyrogallol, phloroglucinol or hydroxyhydroquinone; an aminophenol or a hydroxydiphenylamine.

9. The process according to claim 1 in which 0.001 to 0.01 mol of the phenoxide catalyst is used per mol of alcohol.

10. The process according to claim 4 in which 0.001 to 0.01 mol of the phenoxide catalyst is used per mol of alcohol.

11. The process according to claim 1 in which at least 1.1 mol of ester is used per hydroxyl group present in the alcohol.

12. The process according to claim 4 in which at least 1.1 mol of ester is used per hydroxyl group present in the alcohol.

References Cited
UNITED STATES PATENTS

| | | | |
|---|---|---|---|
| 2,129,662 | 9/1938 | Barrett et al. | 260—486 |
| 2,822,348 | 2/1958 | Haslam | 260—486 |
| 2,618,652 | 11/1952 | Hollyday | 260—486 |
| 2,406,561 | 8/1946 | Rehberg | 260—486 |

LEWIS GOTTS, Primary Examiner

R. S. WEISSBERG, Assistant Examiner

U.S. Cl. X.R.

252—431 R; 260—486 R